(No Model.)
M. A. HICKS.
UMBRELLA ATTACHMENT FOR BICYCLES.
No. 572,298. Patented Dec. 1, 1896.
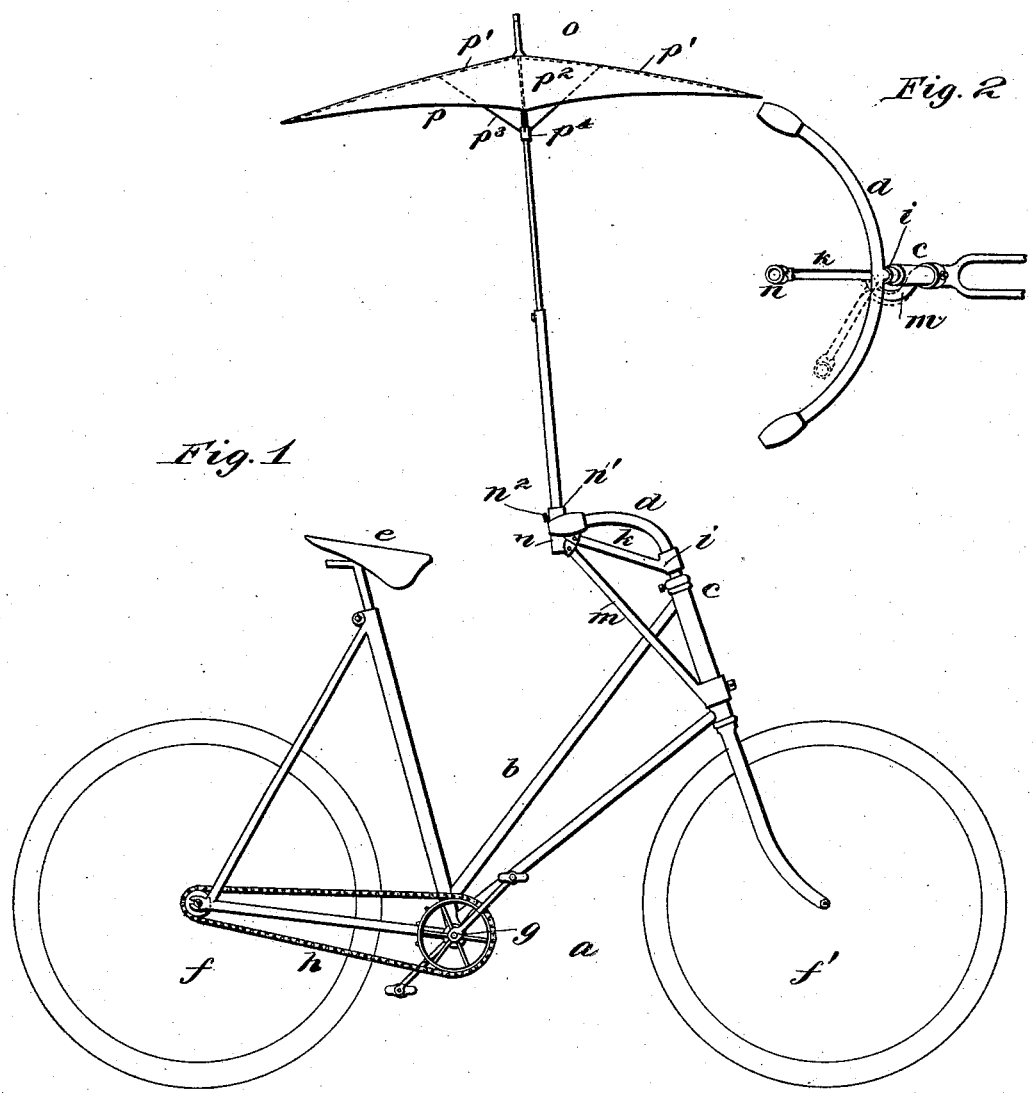

UNITED STATES PATENT OFFICE.

MARY A. HICKS, OF HARTFORD, CONNECTICUT.

UMBRELLA ATTACHMENT FOR BICYCLES.

SPECIFICATION forming part of Letters Patent No. 572,298, dated December 1, 1896.

Application filed February 26, 1896. Serial No. 580,916. (No model.)

*To all whom it may concern:*

Be it known that I, MARY A. HICKS, a citizen of the United States, and a resident of Hartford, in the county of Hartford and State of Connecticut, have invented certain new and useful Improvements in Umbrella Attachments for Bicycles, of which the following is a full, clear, and exact description, whereby any one skilled in the art can make and use the same.

The object of my invention is to provide an umbrella or shade which may be secured to a bicycle and conveniently moved into the proper position, where it will afford ample protection to the user against the rays of the sun; and to this end my invention consists in the details of the several parts making up the device as a whole and its combination with a bicycle, as hereinafter described, and more particularly pointed out in the claim.

Referring to the drawings, Figure 1 is a view in side elevation of a bicycle, showing the umbrella attached and in position for use. Fig. 2 is a detail view, on enlarged scale, of the attachment with parts broken away to show construction.

In the accompanying drawings, the letter $a$ denotes a bicycle or like vehicle; $b$, the frame; $c$, the steering-head; $d$, the handle-bar; $e$, the seat; $f f'$, the wheels; $g$, the crank, and $h$ the chain, the wheel being of any ordinary construction and pattern. To the steering-head $c$ of the wheel near the center of the handle-bar a bracket $i$ is pivoted, and on this bracket an arm $k$ is secured in position to enable it to be swung horizontally, so that when not in use it may occupy a position close to one of the handle-bars, as indicated in dotted lines, Fig. 2, and when in use it will point backward into the plane of the frame and with its outer end at a height a little above the level of the seat, as indicated in Fig. 1 and in full lines in Fig. 2. A diagonally-arranged brace $m$ is pivoted to the frame at its lower end and secured to the arm at its upper end, the function of the brace being to support the weight of the umbrella or parasol, which is secured in a socket-piece $n$, fast to or formed in the outer end of the pivoted arm.

The socket-piece $n$ has a socket $n'$ and is placed in an upright position on the arm, a clamp-screw $n^2$, extending through the wall of the socket, having a broadened head, by means of which it can be turned so as to clamp the handle of the parasol firmly in the socket.

Preferably the parasol $o$ is of special construction, having a handle made of hollow sections, so as to enable the parts to be telescoped or slid one within the other, so as to arrange the device in a more compact form when not required for use. The parasol $p$ is preferably square in outline, made extremely flat in shape, the ribs $p'$ supporting a cover $p^2$, and in turn supported by the braces $p^3$, which are united to a thimble $p^4$ of ordinary construction, which is adjustable along the upper section of the handle, and provided with fastening means, as a catch, to hold it at its upper limit of play, so as to firmly hold the parasol spread open.

When the arm is swung back into the plane of the frame, the parasol is held in proper position to shade the rider of the wheel, but when it is not required the parasol is folded up, the handle telescoped, and the arm swung outward and against the handle-bar, where it will not interfere with the movements of the rider in driving the wheel or in dismounting from the wheel.

I claim as my invention—

In combination with the frame of a bicycle or like vehicle, a bracket pivoted thereto, an arm secured to the bracket and arranged to swing therewith horizontally, a diagonally-arranged brace extending from the outer part of the arm downward to the frame to which it is pivoted, and a socket-piece secured to the outer end of the arm, the socket bearing a clamp device for holding the handle of a parasol, substantially as set forth.

MARY A. HICKS.

Witnesses:
ARTHUR B. JENKINS,
M. BLUMENTHAL.